United States Patent [19]
Schwartz

[11] 3,904,315
[45] Sept. 9, 1975

[54] PITCH CHANGE SIGNAL MEANS WITH DIFFERENTIAL GEARING

[75] Inventor: Robert A. Schwartz, Vernon, Conn.

[73] Assignee: United Aircraft Corporation, East Hartford, Conn.

[22] Filed: July 31, 1974

[21] Appl. No.: 493,933

[52] U.S. Cl. .................. 416/160; 416/162
[51] Int. Cl.² ........................... B64C 11/32
[58] Field of Search ....... 416/155, 156, 157, 157 A, 416/160, 162

[56] References Cited
UNITED STATES PATENTS

| | | |
|---|---|---|
| 3,492,887 | 2/1970 | Ellinger.................... 416/160 UX |
| 3,601,499 | 8/1971 | Ellinger.................... 416/160 |
| 3,672,788 | 6/1972 | Ellinger.................... 416/160 X |
| 3,720,060 | 3/1973 | Davies et al. ............. 416/157 A UX |
| 3,754,484 | 8/1973 | Roberts..................... 416/160 UX |
| 3,801,219 | 4/1974 | Parsons et al............... 416/157 |
| 3,825,370 | 7/1974 | McMurtry et al. .......... 416/160 |

*Primary Examiner*—Everette A. Powell, Jr.
*Attorney, Agent, or Firm*—Norman Friedland

[57] ABSTRACT

The pitch change signal from a fixed to a rotating propeller, fan or the like is effectuated through a differential gear train where the improvement consists of eliminating half of the gear train by employing the driving gearbox if suitably available.

5 Claims, 2 Drawing Figures

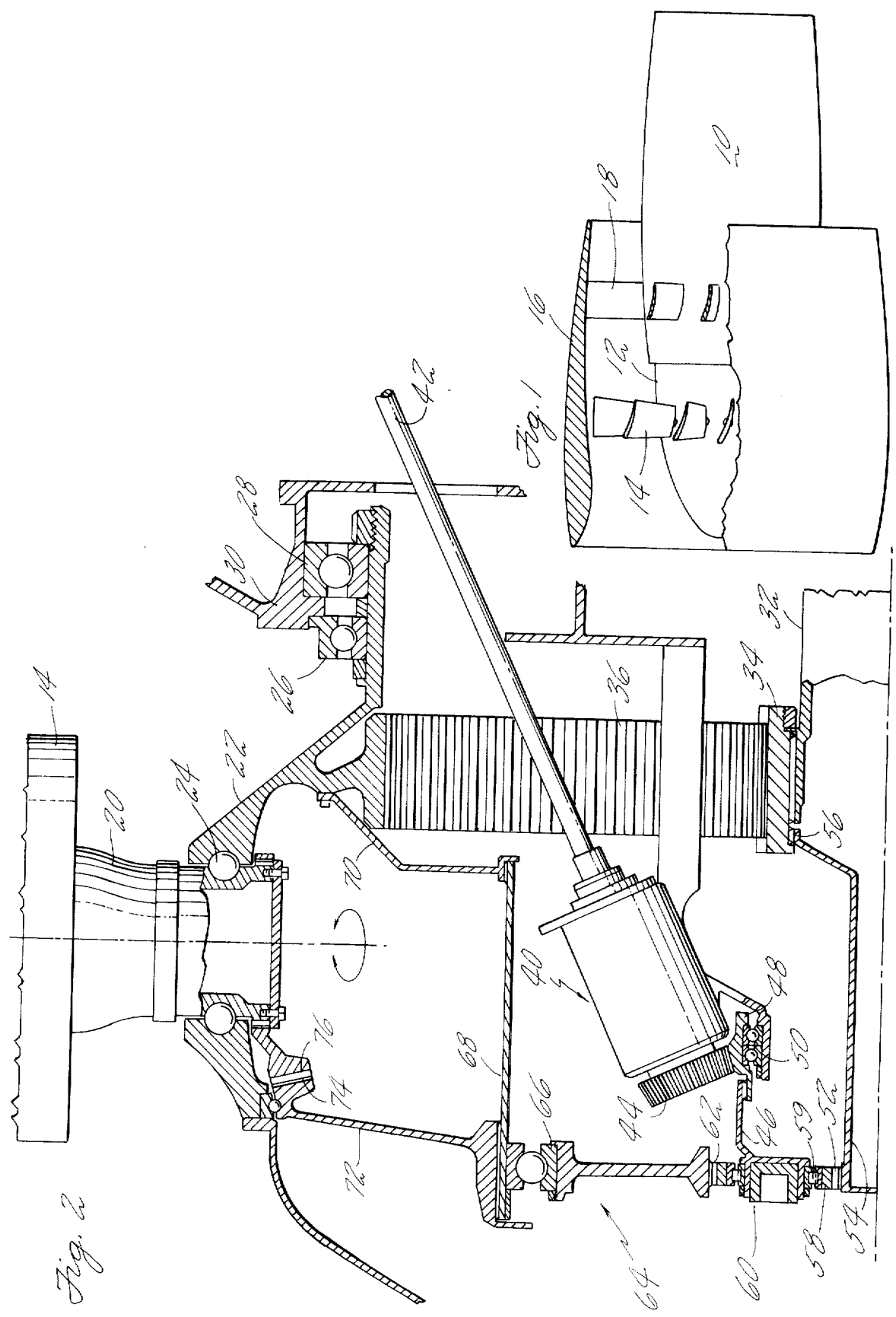

PITCH CHANGE SIGNAL MEANS WITH DIFFERENTIAL GEARING

BACKGROUND OF THE INVENTION

This invention relates to variable pitch fans or propellers and more particularly to the pitch change drive mechanism.

With the advent of variable pitch fan propulsor, particularly of the type that is being developed by Hamilton Standard Division of United Aircraft, which is commonly referred to as a Q-Fan™ propulsor, one of the current ways in manifesting pitch change movement is by a rotary mechanical actuator, such as a harmonic drive. The input to the actuator is transmitted from a stationary station perhaps located in the nacelle which obviously must transverse the rotating boundary line. An acceptable way in accomplishing this interface is by use of a differential gear train.

Obviously, the differential gear train rotates the full life of the system and such rotation is taken place under the loaded condition. On the other hand, the rotary actuator is static except when actually changing pitch. To emphasize this comparison, it is noted that the rotary actuator on a typical installation will have an operating life requirement of 20 hours while the differential operates for about 10,000 hours.

As is well known in the art, as for example as exemplified by U.S. Pat. No. 3,647,320 granted to Chilman et al. on Mar. 7, 1972, the differential gearing typically employs back to back mounted sets of planetary gear trains, one generating a ground reference for the others.

I have found that I can reduce the number of gears, supporting structure, bearings and the like by eliminating one gear train set. That is the sun, ring and planetary gear train, comprising half of the differential gear set is eliminated by virtue of this invention. However, this can only be accomplished in applications where there is an existing gear train, such as the fan gear reduction stage and it is available for use as the signal generator for the differential and where both gear trains have the same ratio. Hence, the fixed ground for the rotary actuator can be rotated with respect to the fan drive ground, and in this manner change blade angle.

SUMMARY OF THE INVENTION

An object of this invention is to reduce weight, size, cost while enhancing the reliability of a propulsor having a fan or propeller variable pitch blades by eliminating one set of the planetary gear train of a differential gear set associated with the pitch change mechanisms where an existing fan or propeller reduction gearbox is available.

Other features and advantages will be apparent from the specification and claims and from the accompanying drawings which illustrate an embodiment of the invention.

BRIEF DESCRIPTION OF THE DRAWINGS

FIG. 1 is a view in elevation and partly in section illustrating a typical ducted fan propulsor.

FIG. 2 is a view partly in elevation and partly in section illustrating the details of this invention.

DESCRIPTION OF THE PREFERRED EMBODIMENT

As in described in U.S. Pat. No. 3,647,320, supra and U.S. Pat. application Ser. No. 334,350 filed on Feb. 21, 1973 by Merritt Andrews et al. and assigned to the same assignee, the interface between the stationary and rotation portion of the variable pitch fan is effectuated by a differential that drives in the latter instance an harmonic actuator. The differential in both instances includes back-to-back planetary gear trains where one generates the ground reference to the other.

A typical application for this type of mechanism is illustrated in FIG. 1 which is a schematic illustration of a ducted fan propulsor comprising an engine 10 driving a fan 12 having a plurality of variable pitch blades 14 rotatably driven in the duct 16 supported to the engine case by a plurality of circumferentially spaced vanes 18.

The operation of the variable pitch ducted fan is well understood by those skilled in the art and a detailed explanation is omitted herefrom for the sake of clarity and simplification. The invention deals with the interface and particularly the differential gear set of the pitch change mechanism which can best be understood by referring to FIG. 2.

As noted, the shank or root 20 of the blade 14 extends in an opening formed in hub 22 and is rotatably supported therein for pitch change movement by retaining balls 24. Hub 22 is rotatably supported by bearings 26 and 28, taking up the radial and thrust loads, to the fixed member 30, which may be the nacelle of the airplane.

The hub 22 is driven by the engine via its drive shaft 32 through the gear reduction comprising sun gear 34 splined to shaft 32, planetary gear 36 (one being shown) and ring gear 38 formed integral with hub 22.

Pitch change is effectuated by the pitch change input connection means 40 which serves to transmit from the stationary part of the system a signal calling for a change in blade angle to the rotating portion. Suffice it to say that rotation of shaft 42 rotates bevel gear 44 which drives cage 46 via the gear and spline assembly 48 supported by bearings 50. Cage 46 is a part of a differential gear set and owing to this invention only one set of planetary gears are utilized as opposed to the normal situation where two sets of planetary gears are utilized. Sun gear 52 supported to shaft 54 which is splined by suitable spline 56 to sun gear 34 is obviously referenced at that particular speed. Planetary gear 58 (only one being shown in section) rotatably supported by roller bearing 59 about stub shaft 60 and engaging ring gear 62 is driven by sun gear 52 and the number of teeth in each of the mating gears are selected so that its ratio is the same as the ratio of the speed reduction gear train driving hub 22.

From the foregoing, when there is no pitch change input signal ring gear 62 is rotating at the same speed as hub 22.

The rotary actuator shown in this embodiment although not necessarily limited thereto is a suitable harmonic drive generally illustrated by reference numeral 64 comprising the wave generator 66, flexspline 68 which is referenced or grounded to the rotating hub 22 via connecting ring 70 and the rigid spline 72. For a more detailed description of a harmonic drive reference is made to U.S. Pat. application Ser. No. 334,350 filed on Feb. 21, 1973 supra.

From the foregoing it is apparent that the input pitch change signal causes the cage 46 to rotate adding to or substracting from the planetary gear speed which in turn affects the speed of the ring gear 62. This speed signal is the input to the harmonic drive 64, driving the wave generator at a speed relative to hub 22 which in turn rotates rigid spline 72 also relative to the hub. Bevel gear 74 formed integral with rigid spline 72 mates with segmental bevel gear 76 connected to root 20 of blade 14 for imparting pitch change movement. Obviously, the blade angle is increased and decreased depending on whether the harmonic drive is rotating faster or slower relative to the hub speed.

Hence, according to the teachings of this invention a single set of planetary gears serve the same purpose as a dual set which not only eliminates the additional planetary gears, but also the additional sun and ring gears, bearing and supporting mechanism. Half the number of gears and bearings are utilized in the differential with an attendant reduction in cost, weight, complexity while improving reliability.

It should be understood that the invention is not limited to the particular embodiments shown and described herein, but that various changes and modifications may be made without departing from the spirit or scope of this novel concept as defined by the following claims.

I claim:

1. For a fan or propeller having variable pitch blades and means including a gearbox having a train of gears for reducing the speed of the fan or propeller from its driving means, pitch change means including a rotary actuator for changing the blade angle of the blades, the improvement comprising a differential gear set operatively connected to said rotary actuator consisting of a sun gear, one set of planetary gears and a ring gear connected to said rotary actuator, said sun gear being grounded to a rotating member of said gearbox, said differential gear set having the same gear ratio as the ratio of the train of gears of said gearbox, a cage supporting said set of planetary gears and movable to add to or substract from the rotational speed of said ring gear, means interconnecting said blades and said rotary actuator for imparting pitch change movement in response to said added or substracted speed, and means for imparting movement to said cage in accordance with a desired blade angle.

2. For a fan or propeller as claimed in claim 1 wherein said rotary actuator is a harmonic drive.

3. For a fan or propeller as claimed in claim 2 including a hub supporting said blades, said harmonic drive including a spline member connected to said hub and another spline member connected to said blade.

4. In combination, a variable pitch propeller or fan driven by a power plant, a hub supporting a plurality of blades for pitch change movement, gear reduction means between the power plant and propeller or fan drivingly connected to said hub to rotate it at a speed less than that of the power plant, said gear reduction means including a first sun gear, a first ring gear, and a first set of planetary gears, said first ring gear being connected to said hub, rotary actuation means being grounded to said hub for rotation at the same speed thereof, means for actuating said rotary actuation means from a stationary location remote from said hub for changing the blade angle of the blades in accordance to a desired blade angle setting, said means including a differential gear set consisting of a second sun gear grounded to said first sun gear, a second ring gear operatively connected to said rotary actuator, and a second set of planetary gears, a cage rotary supporting said planetary gears and means for imparting movement to said cage for changing the relative speed of said differential gear set for effectuating pitch change movement.

5. The combination as claimed in claim 4 wherein said rotary actuator includes a harmonic drive having a rigid spline connected to said blade for changing the blade angle thereof, a flexible spline drivingly connected thereto connected to said hub for rotating at the same speed thereof, and a motion generator driven by said second ring gear, whereby rotation of said cage increases and reduces the relative speed of said differential gear set with respect to said hub for effectuating pitch change movement.

* * * * *